United States Patent

[11] 3,559,957

| [72] | Inventor | Alfred Max Hurter |
| | | Beaconsfield, Quebec, Canada |
| [21] | Appl. No. | 766,901 |
| [22] | Filed | Oct. 11, 1968 |
| [45] | Patented | Feb. 2, 1971 |
| [73] | Assignee | Stadler Hurter International Ltd. |
| | | Montreal, Quebec, Canada |
| [32] | Priority | Oct. 20, 1967 |
| [33] | | Great Britain |
| [31] | | 47904/67 |

[54] TURBINE-TYPE CHLORINE MIXER
9 Claims, 2 Drawing Figs.

[52] U.S. Cl.................................................. 259/10,
261/84, 261/93
[51] Int. Cl..................................................... B01f 7/04

[50] Field of Search............................................ 259/7—10,
25, 26, 45, 46, 68, 69, 109, 110, D.K. Horiz, 23,
24, 43, 44, 107, 108; 261/84, 85, 91, 92;
34/179—183

[56] References Cited
UNITED STATES PATENTS
| 3,319,937 | 5/1967 | Wilson et al.................. | 259/8 |
| 3,321,283 | 5/1967 | Ewald........................... | 259/8 |

Primary Examiner—Edward L. Roberts
Attorney—Alan Swabey

ABSTRACT: An apparatus for continuously mixing together pulp and chlorine which comprises a cylindrical casing, spaced-apart stationary agitating elements extending in a circular row about, and attached to, the inner wall of the casing, and a plurality of spaced-apart, radially extending blades mounted on an axial, rotatable shaft within the casing.

PATENTED FEB 2 1971

3,559,957

*INVENTOR*
Alfred Max HURTER

*Alan Swabey*

ATTORNEY

TURBINE-TYPE CHLORINE MIXER

BACKGROUND OF THE INVENTION

1. Field of Invention

This invention relates to an impeller-type pulp-chlorine mixer used in the production of bleached pulp.

For the production of high brightness pulp, continuous multistage bleaching is now used. The pulp is treated in successive stages with chemicals such as chlorine gas, caustic soda solution, sodium or calcium hypochlorite and chlorine dioxide in a processing system to bleach the pulp. The bleaching is performed in large retention tanks or towers where the pulp and chemicals are held for a required length of time until the chemical reactions for the particular stage of bleaching is completed. The flow of the pulp into and out of these towers is continuous, and it is necessary to mix the chemicals continuously with the pulp as it enters these towers. Thorough mixing of the chemicals with the pulp is necessary so that the distribution of the chemicals with the pulp within the tower is uniform to provide a uniform quality of pulp.

2. Description of Prior Art

At the chlorination stage of the bleaching process, the pulp is mixed with chlorine gas prior to entering into a treatment tower. The apparatus generally used for mixing the chlorine gas with the pulp comprises a cylindrical section in the pulp conduit leading to the tower having a shaft running therethrough with wobble plates mounted on the shaft. The chlorine is introduced into the pulp as a gas at or adjacent the start of the cylindrical section. The rotation of the wobble plates within the cylinder agitates the pulp passing through it and mixes the chlorine with the pulp. However, chlorine gas is not very soluble in water, and since relatively large quantities of the gas must enter into solution with the pulp (1 to 14 percent of the weight of the oven dried pulp), it is not possible, with the agitation or mixing action provided by the wobble plates, for the chlorine to go into the pulp solution in the short length of time that the chlorine and pulp are being mixed in the apparatus. As a result, the chlorine is usually just dispersed throughout the pulp in the form of bubbles. Consequently, upon passing the pulp-chlorine mixture to the treatment tower from the mixing apparatus, there is a possibility that these chlorine gas bubbles will coalesce in the tower, become larger, and, as they rise through the pulp in the tower, they will upset the uniformity of the bleaching process carried on in the tower. The bleached pulp emerging from the tower will, therefore, not be of uniform quality.

To obtain better dispersion and solubility of the chlorine in the pulp, the wobble plate-type mixer would have to be greatly enlarged and/or lengthened in order to retain the pulp and chlorine mixture for a sufficient length of time to thoroughly disperse the chlorine in solution in the pulp. Incorporating the enlarged mixer in a bleaching system could be difficult, because of space requirements, and, in addition, such an enlarged mixer would increase the cost of the system.

SUMMARY OF INVENTION

The purpose of the present invention is to provide an apparatus for continuously mixing a pulp-chlorine mixture which provides increased turbulence to disperse the chlorine thoroughly in the pulp slurry in order that the reaction between the chlorine and slurry may be substantially completed so as to reduce the possibility of the chlorine coalescing into bubbles in the tower and disrupting the bleaching process. The mixer also provides, through its construction, an increased retention time for the pulp-chlorine mixture to disperse the chlorine in solution in the pulp while still being compact in size and relatively inexpensive to manufacture.

The increased high speed turbulence and resultant better mixing and agitating action is obtained by utilizing an impeller-type mixing apparatus.

The invention is particularly directed toward a pulp-chlorine mixer comprising a closed cylindrical casing, a rotatable shaft mounted axially through the ends of the casing, and an inlet and spaced-apart outlet for feeding a pulp-chlorine mixture through the casing. Stationary agitating elements are attached to the inner wall of the casing, rotatable agitating elements are attached to the shaft, and both stationary and rotatable elements cooperate upon rotation of the shaft to shear and turbulently mix the pulp and chlorine mixture.

BRIEF DESCRIPTION OF THE DRAWINGS

The invention will now be described in detail having reference to the accompanying drawings, in which.

DESCRIPTION OF THE PREFERRED EMBODIMENT

Figure 1:
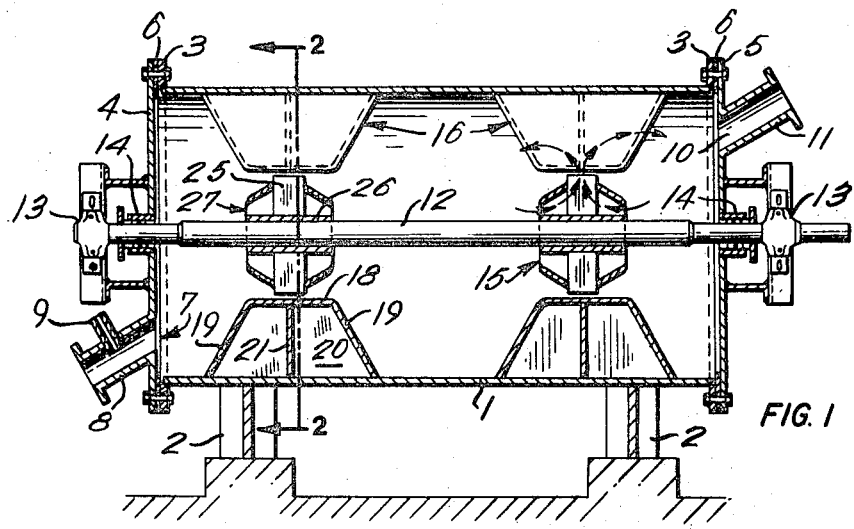
FIG. 1 is a longitudinal cross section of the mixer taken along line 1–1 of FIG. 2.
Figure 2:
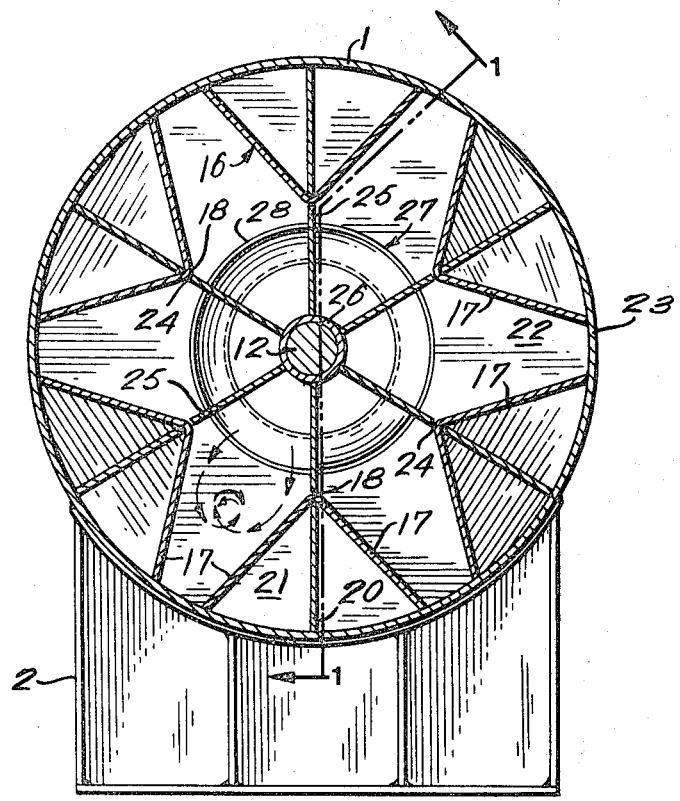
FIG. 2 is a cross section of the device taken along line 2–2 of FIG. 1.

As shown in the drawings, the pulp-chlorine mixer of the present invention comprises a cylindrical outer casing 1 mounted on legs 2. The ends of the casing are provided with flanges 3 for receiving flanged inlet and outlet covers 4, 5 for closing the casing. A gasket 6 is located between the casing and cover flanges to seal the casing. The inlet cover 4 has an opening 7 adjacent its lower edge for receiving a pulp stock inlet tube 8. The pulp inlet tube is provided with a fitting 9 allowing chlorine to be added to the pulp just before it is fed through the inlet tube into the mixer casing. The outlet cover 5 has, adjacent its upper edge, an opening 10 for receiving a pulp outlet tube 11 through which the mixed pulp and chlorine passes from the mixer to a treatment or bleaching tower which is not shown.

A shaft 12 passes axially through the mixer and is mounted in bearings 13 located on each cover 4, 5. Suitable sealing means 14 are provided for preventing leakage of the stock from the openings in the covers through which the shaft passes. The shaft is rotatable by a motor, not shown, coupled to one end of the shaft.

Located within the casing of the mixer are agitating elements for turbulently mixing the pulp and chlorine as they are passed continuously through the casing from the inlet tube 8 to the outlet tube 11. One or more sets or arrangements of agitating elements may be provided. In the preferred embodiment, as shown in the drawings, two sets are used.

Each set 15 of agitating elements includes a circular row of equally spaced-apart stationary agitating elements 16 attached to the inner wall of the casing in a plane transverse to the longitudinal axis of the casing. Each stationary agitating element 16 comprises trapezoidal sidewalls 17 sloping inwardly toward each other from the casing wall and preferably joined at their inner radial edges to from an edge 18. Substantially triangular end walls 19 close off the agitating elements. The side and end walls are formed of plate material. If desired, a central longitudinal extending reinforcing plate 20, as well as a transverse reinforcing plate 21, can be used to strengthen the stationary agitating elements. The sidewalls of adjacent elements preferably are spaced from one another to form a series of tapered troughs 22. Each tapered trough is formed by the sidewalls 17 of adjacent elements and a portion 23 of the inner wall of the casing. The troughs extend about a circular portion of the inner periphery of the casing.

The free radial inner edges 18 of the stationary agitating elements 16 are closely spaced to the outer periphery of rotatable agitating elements mounted on the shaft 12. The rotatable agitating elements preferably comprise a plurality of flat rectangular blades 25 attached to the shaft 12 by a collar 26 with the free outer radial edges 24 closely spaced in a radial direction from the inner edges 18 of the stationary elements during rotation of the blades. The blades extend radially outwardly from the shaft, are equally spaced about the shaft and preferably equal in number to the stationary elements. The free edges 18, 24 of both the stationary elements and the blades extend in a direction parallel to the longitudinal axis of the casing with the free edges 24 of the blades centrally located with respect to the edges of the stationary elements.

Flow directing means are fixed to the rotatable agitating elements. The flow directing means comprise circular rings 27, concentric to the longitudinal axis of the casing, and attached by welding or other suitable means to the side edges of the blades 25. The rings have a segmented conical shape and are attached to the blades closely adjacent their free ends 24 by the larger diameter edge 28.

Preferably, the length of the mixer casing is approximately twice its diameter and each set of stationary and rotatable agitating elements is mounted one half the distance of the diameter of the casing from its ends.

In operation, the pulp along with the chlorine is continuously fed into the casing through inlet tube 8. The shaft 12 is rotated at a high speed thereby also rotating the attached blades 25. The free edges 24 of the blades pass the edges 18 of the fixed elements 16 with very little clearance thus shearing the pulp to ensure good mixing. As the shaft rotates, the mixture of chlorine and pulp is drawn in through the rotating conical rings 27 and flung out by the blades 25 into the troughs 22. The pulp flows down the sidewalls 17 of the stationary elements in streams and the streams turbulently intermingle at the bottom of the trough as shown by the arrows. The impeller action of the blades in cooperation with sloping sides of the stationary elements provides high turbulence and good mixing of the pulp and chlorine. The sloping end walls of the stationary elements and the conical rings also serve to swirl and mix the chlorine-pulp mixture longitudinally of the casing. Continuous feeding of mixture in from inlet tube 8 causes the pulp to move through the mixer and out the outlet tube into a chlorination tower.

The mixer is designed to have a size such that the pulp and chlorine mixture is retained therein for at least approximately a minute in order to obtain thorough mixing and good reaction of the chlorine with the pulp.

I claim:

1. A mixer comprising a closed cylindrical casing, a shaft mounted axially within the casing, means for rotating said shaft, an inlet in the casing for continuously introducing materials to be mixed into the casing, an outlet in the casing spaced from the inlet for removing the mixed materials from the casing, at least one set of agitating elements within the casing for mixing the materials, the agitating elements comprising a plurality of blades attached at one end about a circumferential section of the shaft and extending substantially radially therefrom toward the inner wall of the casing to terminate in free end edges, a plurality of spaced-apart stationary elements attached about a circumferential section of the casing, which circumferential section is aligned with the circumferential section of the shaft, said stationary elements attached at one end to the casing and extending radially inwardly toward the rotatable shaft to terminate in free end edges, each of said stationary elements having surfaces for deflecting materials which are radially directed against said stationary elements by the blades when the shaft is rotated, said stationary elements equally spaced from one another about the circumferential section of the casing, and said deflecting surfaces including a first pair of walls which slope inwardly from the casing wall toward each other, the free ends of the blades, being located a distance, from the longitudinal axis of the shaft, which is slightly less than the distance the free end edges of the stationary elements are located from the longitudinal axis of the shaft, whereby the free end edges of the blades pass closely adjacent the free end edges of the stationary elements when the shaft is rotated, to shear, turbulently mix, and recirculate the materials.

2. A mixer as claimed in claim 1, wherein the radial inner ends of said walls of each stationary element are joined to form the free end edge of each stationary element, each free end edge extending substantially parallel to the longitudinal axis of the shaft.

3. A mixer as claimed in claim 2, wherein said deflecting surfaces include a second pair of walls extending transversely to the first pair of walls.

4. A mixer as claimed in claim 3, wherein said second pair of walls comprise end walls joined to said first pair of walls, said end walls sloping inwardly from the casing toward each other.

5. A mixer as claimed in claim 4, wherein said first pair of walls are trapezoidal in shape and the end walls are triangular in shape.

6. A mixer as claimed in claim 1, including two rings, concentric to the axis of the shaft, one ring located on one side of each blade, the rings attached to the respective side edges of the blades for directing the material to the blades.

7. A mixer as claimed in claim 6, wherein the rings have a segmented conical shape with the large diameter of the ring attached to the side edges of the blades.

8. A mixer as claimed in claim 1, including a second set of agitating elements, said second set of agitating elements comprising a plurality of blades attached at one end about a second circumferential section of the shaft and extending substantially radially outwardly therefrom toward the inner wall of the casing to terminate in free end edges, said second circumferential section of the shaft spaced longitudinally along the shaft from said first circumferential section, a plurality of spaced-apart stationary elements attached about a second circumferential section of the casing, which second section is aligned with the second circumferential section of the shaft, said stationary elements attached at one end to the casing and extending inwardly toward the rotatable shaft to terminate in free end edges, said stationary elements having material deflecting surfaces.

9. A mixer as claimed in claim 8, wherein the casing has a length approximately twice its diameter, said first set of agitating elements located in a diametrical plane spaced a distance equal to approximately one-half the diameter of the casing from one end of the casing, said second set of agitating elements spaced a distance equal to approximately one-half the diameter of the casing from the other end of the casing.